(12) United States Patent
Fedde et al.

(10) Patent No.: US 8,483,336 B2
(45) Date of Patent: Jul. 9, 2013

(54) SYSTEM AND METHOD FOR EXTRACTION OF COMMUNICATION INTERFERENCE

(75) Inventors: Melissa L. Fedde, Aurora, CO (US); Ronald D. Lewis, Centennial, CO (US); David W. Holsteen, Aurora, CO (US); Eric R. Grover, Aurora, CO (US)

(73) Assignee: Raytheon Company, Waltham, MA (US)

( * ) Notice: Subject to any disclaimer, the term of this patent is extended or adjusted under 35 U.S.C. 154(b) by 412 days.

(21) Appl. No.: 12/974,122

(22) Filed: Dec. 21, 2010

(65) Prior Publication Data

US 2012/0155564 A1    Jun. 21, 2012

(51) Int. Cl.
| | |
|---|---|
| *H04L 25/08* | (2006.01) |
| *H04L 1/00* | (2006.01) |
| *H04B 1/10* | (2006.01) |
| *H03K 6/04* | (2006.01) |
| *H03K 5/01* | (2006.01) |
| *H03D 1/06* | (2006.01) |
| *H03D 1/04* | (2006.01) |

(52) U.S. Cl.
USPC ......................................................... 375/346

(58) Field of Classification Search
USPC ........................... 375/285, 316, 324, 340, 346
See application file for complete search history.

(56) References Cited

U.S. PATENT DOCUMENTS

| 5,596,439 | A | 1/1997 | Dankberg et al. |
| 6,757,346 | B2 * | 6/2004 | Saito et al. ................. 375/349 |
| 2002/0042290 | A1 | 4/2002 | Williams et al. |
| 2003/0176169 | A1 * | 9/2003 | Pajukoski et al. ............... 455/77 |

OTHER PUBLICATIONS

Written Opinion of the International Searching Authority for International Application No. PCT/US2011/061296, filed Nov. 18, 2011, Written Opinion of the International Searching Authority dated Feb. 7, 2012 and mailed Feb. 13, 2012 (3 pgs.).
International Search Report for International Application No. PCT/US2011/061296, filed Nov. 18, 2011, International Search Report dated Feb. 7, 2012 and mailed Feb. 13, 2012 (3 pgs.).

* cited by examiner

*Primary Examiner* — Ted Wang
(74) *Attorney, Agent, or Firm* — Christie, Parker & Hale, LLP

(57) ABSTRACT

A method for the extraction of communication interference, may include converting a digital baseband signal into an analog signal, transmitting the analog signal; receiving the analog signal, converting the analog signal after receipt into a received digital signal, modulating the digital baseband signal to generate a reference signal, estimating a delay between the received digital signal and the reference signal, generating an aligned reference signal based on the reference signal and the delay, estimating a transmission gain of the received digital signal based on the received digital signal and the aligned reference signal, multiplying the aligned reference signal by the transmission gain to generate a scaled reference signal, and subtracting the scaled reference signal from the received digital signal to generate an estimated interference present in the received digital signal.

18 Claims, 3 Drawing Sheets

SYSTEM AND METHOD FOR EXTRACTION OF COMMUNICATION INTERFERENCE

TECHNICAL FIELD

The present disclosure relates generally to wireless communication and, more particularly, to extraction of communication interference.

BACKGROUND

Satellite communications systems and other wireless communications are used in a variety of telecommunications systems, television, radio and other media systems, data communication networks, military and defense communications systems, and other systems to convey information between remote points using transmitters and receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. On the other hand, a receiver is an electronic device which, also usually with the aid of an antenna, receives and processes a electromagnetic signal. In certain instances, a transmitter and receiver may be combined into a single device called a transceiver.

Because wireless communications are transmitted "over-the-air," such communications may be subject to interference, whether such interference is incidental or a result of unauthorized use and/or tampering. Accordingly, methods and systems to identify and quantify such interference may be critical to the accuracy and security of communications.

SUMMARY

In accordance with some embodiments of the present disclosure, a method for extraction of communication interference may include converting a digital baseband signal into an analog signal. The method may also include transmitting the analog signal. The method may additionally include receiving the analog signal. The method may further include converting the analog signal after receipt into a received digital signal. The method may also include modulating the digital baseband signal to generate a reference signal. Moreover, the method may include estimating a delay between the digital received signal and the reference signal. The method may additionally include generating an aligned reference signal based on the reference signal and the delay. The method may further include estimating a transmission gain of the received digital signal based on the received digital signal and the aligned reference signal. Additionally, the method may include multiplying the aligned reference signal by the transmission gain to generate a scaled reference signal. The method may also include subtracting the scaled reference signal from the received digital signal to generate an estimated interference present in the received digital signal.

Technical advantages of one or more embodiments of the present disclosure may include the ability to replicate a reference signal component within the received signal using the transmitted reference signal and estimates of delay and scale factor. The precision of this replication may allow for high fidelity extraction of the reference signal from the received signal leaving any interfering signal available for characterization and further processing.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
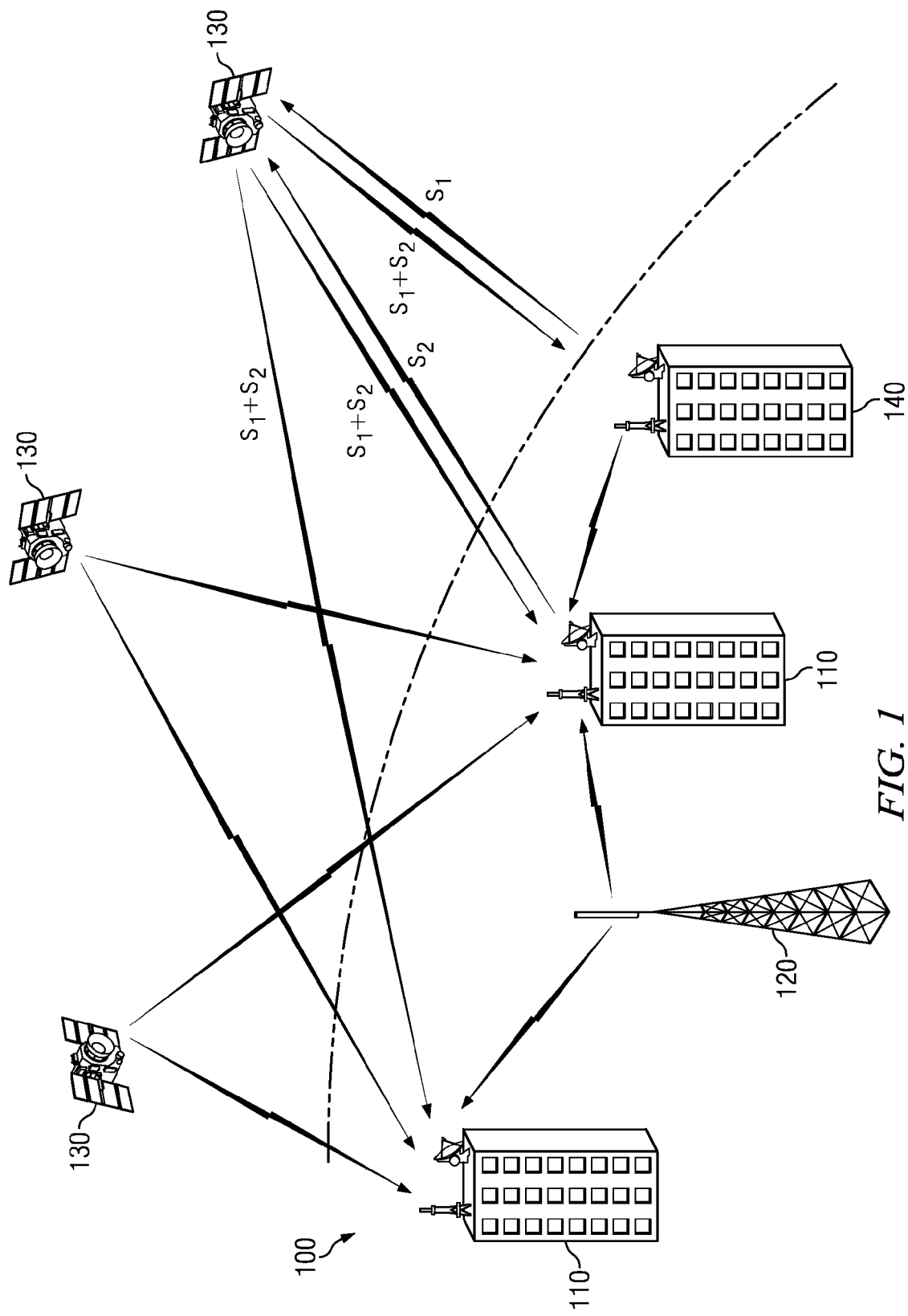
FIG. 1 illustrates a schematic diagram of an example wireless communication system, in accordance with embodiments of the present disclosure.

FIG. 1 illustrates a schematic diagram of an example of communication system 100, in accordance with certain embodiments of the present disclosure. As shown in FIG. 1, system 100 may include one or more terminals 110 and 140, one or more terrestrial base stations 120, and one or more satellites 130. For simplicity, only three terminals 110 and 140, two base stations 120, and three satellites 130 are shown in FIG. 1. A terminal 110 and 140 may include any device, system, or apparatus configured to process, transmit, and/or receive wireless communications signals, and may also be referred to as a remote station, a mobile station, an access terminal, user equipment (UE), a wireless communication device, a cellular phone, or some other terminology. In some embodiments, a terminal 140 may be specially configured to extract interference from a transmitted signal. Terrestrial base stations 120 may include any ground-based system configured to transmit, receive, repeat, and/or amplify wireless communications signals, and may also be referred to as a fixed station, an access point, or some other terminology. Satellites 130 may include any artificial satellite in orbit about the Earth that is configured to transmit, receive, amplify, repeat, and/or amplify wireless communications signals.

In FIG. 1, each terminal 110 and 140 is shown as simultaneously receiving signals from multiple transmitting sources, where a transmitting source may be terrestrial base station 120 or satellite 130. In certain embodiments, terminal 110 or 140 may also be a transmitting source. In general, terminal 110, 140 may receive signals from zero, one, or multiple transmitting sources at any given moment.

Figure 2:
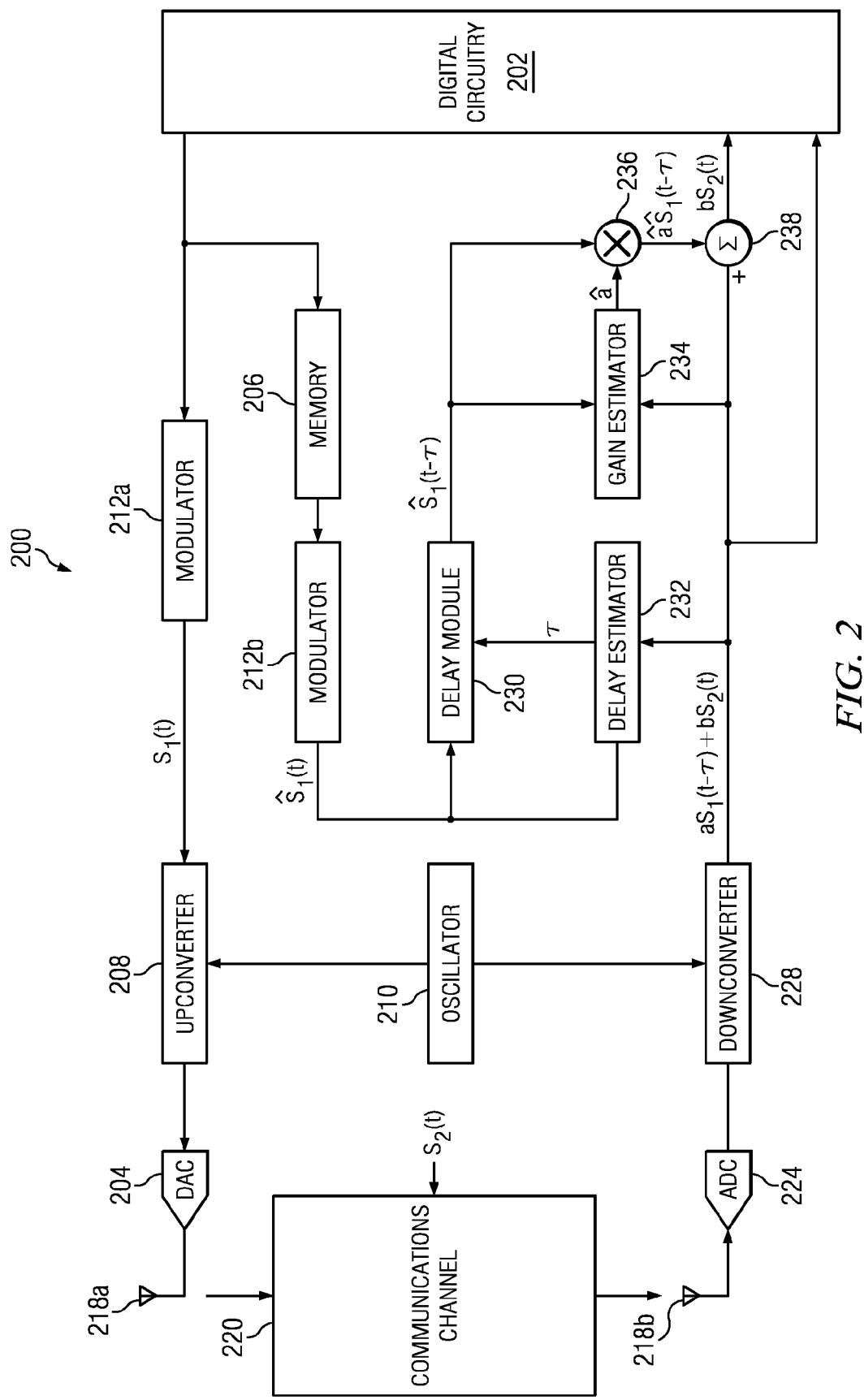
FIG. 2 illustrates a block diagram of selected components of an example transmitting and/or receiving element, in accordance with embodiments of the present disclosure.

FIG. 2 illustrates a block diagram of selected components of an example of transmitting and/or receiving element 200 (e.g., a terminal 140), in accordance with certain embodiments of the present disclosure. Given the functionality of element 200, element 200 may be considered a transmitter, and a receiver.

As depicted in FIG. 2, element 200 may include a transmit path having a modulator 212a, an upconverter 208 and a digital-to-analog converter (DAC) 204. Modulator 212a may be configured to modulate a baseband digital signal received from digital circuitry 202 and generate signal $S_1(t)$. Upconverter 208 may be configured to frequency upconvert the signal received from modulator 212a using an oscillator signal provided by oscillator 210. DAC 204 may be configured to receive the signal from upconverter 208 and convert such digital signal into an analog signal for transmission via antenna 218a. Antenna 218a may receive the analog signal and transmit such signal via communication channel 220 (e.g., to one or more of terminal 110, base station 120, and/or satellite 130).

Similarly, element 200 may include a receive path having an analog-to-digital converter (ADC) 224 and a downconverter 228. ADC 224 may be configured to receive a transmitted analog signal from communications channel 220 via antenna 218b and convert such analog signal into a modulated digital signal. Downconverter 228 may be configured to frequency downconvert the modulated digital signal into a received digital signal based on an oscillator signal provided by oscillator 210. In order to detect and quantify interference, element 200 may transmit a reference signal $S_1(t)$ (e.g., from a terminal 140 to a satellite 130) and receive back the same signal. As shown in FIG. 2, in such a case, the received digital signal may be represented by the equation $aS_1(t-\tau)+bS_2(t)$, where $S_1(t-\tau)$ is a time-delayed version of transmitted signal $S_1(t)$ delayed by a delay $\tau$, a is a gain resulting from transmission and receipt of the signal, and $bS_2(t)$ is scaled interference. While FIG. 2 depicts various signals $S_1(t)$, $S_1(t-\tau)$, and $bS_2(t)$ as continuous signals, it is noted that such signals may also represent snapshots of digital data streams.

Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-generated sample sequence.

Digital circuitry 202 may include any system, device, or apparatus configured to process digital signals and information received via the receive path, and/or configured to process signals and information for transmission via the transmit path. Such digital circuitry 202 may include one or more microprocessors, digital signal processors, and/or other suitable devices. In some embodiments, one or more of the other components of element 200 described in this disclosure may be a part of digital circuitry 202.

In addition to the components above, element 200 may include an interference extractor having a memory 206, a modulator 212b, a delay module 230, a delay estimator 232, a gain estimator 234, a multiplier 236, and a summer 238. In some embodiments, one or more components of the interference extractor may be implemented in a general purpose processor, a specialized processor (e.g., a digital signal processor or a graphics processing unit) or in a field-programmable gate array (FPGA).

Memory 206 may be communicatively coupled to digital circuitry 202 and may include any system, device, or apparatus configured to retain program instructions and/or data for a period of time (e.g., computer-readable media). Memory 206 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data for later use after power to element 200 is turned off. In operation, memory 206 may store a baseband digital signal for processing by the interference extractor.

Modulator 212b may be configured to modulate a the baseband digital signal stored in memory 206 to generate a copy of reference signal $\hat{S}_1(t)$. Modulator 212b may be similar or identical to modulator 212a.

Delay estimator 232 may be any system, device or apparatus configured to compare the reference signal $\hat{S}_1(t)$ generated by modulator 212b to the received digital signal $aS_1(t-\tau)+bS_2(t)$ generated by downconverter 228 in order to determine an approximate delay $\tau$ necessary to align the two signals (e.g., align the information embedded within the two signals). Delay estimator 232 may communicate the determined delay to delay module 230. In some embodiments delay estimator 232 may implement a fast correlation between the reference signal and the received digital signal, determine if the maximum correlation peak is statistically significant, and, if so, may determine the time delay $\tau$ necessary to align the signals.

Delay module 230 may be any system, device or apparatus configured to receive the reference signal $\hat{S}_1(t)$ generated by modulator 212b and the delay $\tau$ and based on such inputs, generate an aligned signal $\hat{S}_1(t-\tau)$. In some embodiments, delay module 230 may generate an aligned signal by discarding an appropriate number of digital samples from reference signal $\hat{S}_1(t)$.

Gain estimator 234 may be any system, device or apparatus configured to receive the aligned reference signal $\hat{S}_1(t-\tau)$ and the received digital signal $aS_1(t-\tau)+bS_2(t)$ and based on such inputs, generate a gain $\hat{a}$ approximately equal to the actual signal gain a. In certain embodiments, gain estimator 234 may implement an adaptive algorithm to estimate the multiplicative factor $\hat{a}$ necessary to scale the aligned reference signal $\hat{S}_1(t-\tau)$ to the non-interference portion of the received digital signal $aS_1(t-\tau)+bS_2(t)$. For example, in one embodiment, the aligned reference signal and the received digital signal may be independently scaled by automatic gain control (AGC) circuits to normalize their amplitudes. Subsequently, these AGC results may be applied to an adaptive least mean square (LMS) to allow convergence of the gain estimate and to estimate the gain.

Multiplier 236 may be any system, device or apparatus configured to receive estimated gain $\hat{a}$ and aligned reference signal $\hat{S}_1(t-\tau)$ and based on such inputs, generate a scaled reference signal $\hat{a}\hat{S}_1(t-\tau)$.

Summer 238 may be any system, device or apparatus configured to subtract the scaled reference signal $\hat{a}\hat{S}_1(t-\tau)$ from the received digital signal $aS_1(t-\tau)+bS_2(t)$ to generate an interference signal approximately equal to the interference $bS_2(t)$. The interference signal may be communicated to digital circuitry for further processing.

Figure 3:
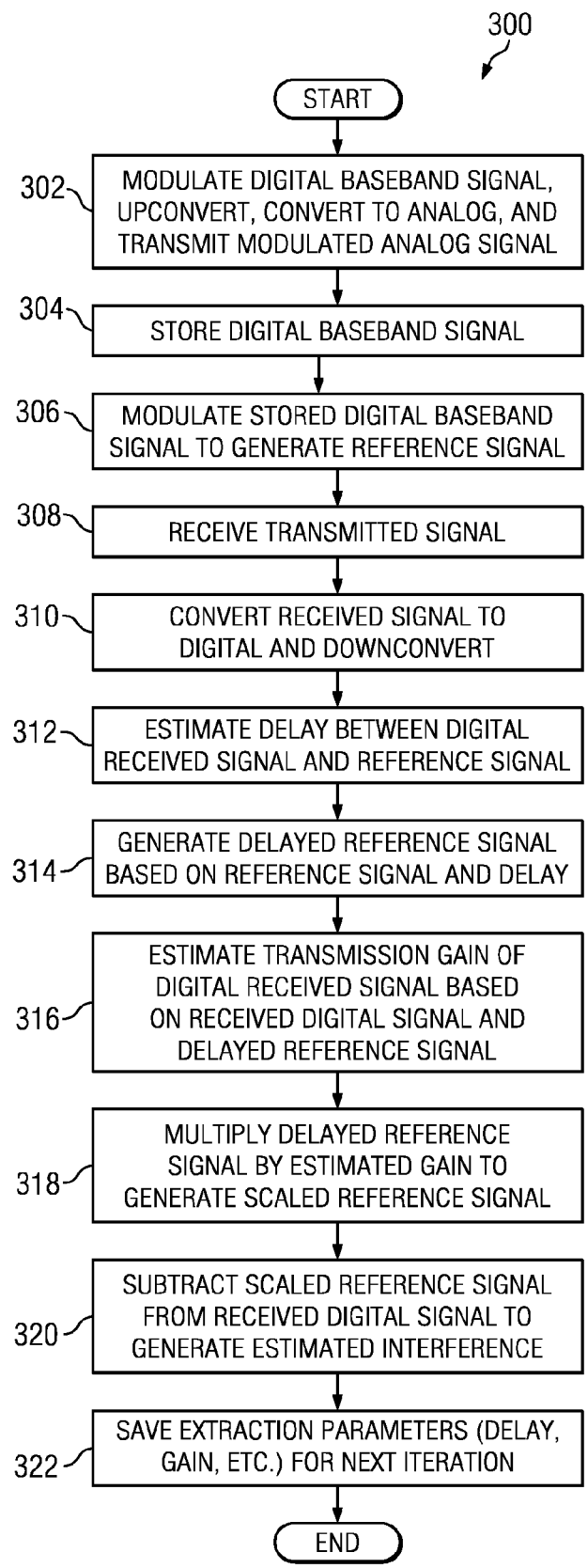
FIG. 3 illustrates a flow chart for an example method for extracting interference, in accordance with embodiments of the present disclosure.

FIG. 3 illustrates a flow chart for an example method 300 for extracting interference, in accordance with embodiments of the present disclosure. According to some embodiments, method 300 may begin at step 302. As noted above, teachings of the present disclosure may be implemented in a variety of configurations of system 100 and/or element 200. As such, the preferred initialization point for method 300 and the order of the steps 302-320 comprising method 300 may depend on the implementation chosen.

At step 302, modulator 212a may modulate a digital baseband signal generated by digital circuitry 202, upconverter 208 may translate the modulated signal to standard intermediate frequencies (IF). DAC 204 may convert the translated signal to an analog signal, and antenna 218a may transmit the modulated analog signal via communications channel 220. At step 304, memory 206 may store the digital baseband signal generated by digital circuitry 202. At step 306, modulator 212b may modulate the stored digital baseband signal to generate a reference signal.

At step 308, antenna 218b may receive the transmitted signal from communications channel 220. At step 310, ADC 224 may convert the received signal to the digital domain, and downconverter 228 may translate the signal to generate a digital received signal.

At step 312, delay estimator 232 may estimate the delay between the digital received signal and the reference signal. At step 314, delay module 230 may generate an aligned reference signal based on the reference signal and the estimated delay. At step 316, gain estimator 234 may estimate the transmission gain of the digital received signal based on the received digital signal and the aligned reference signal.

At step 318, multiplier 236 may multiply the aligned reference signal by the estimated gain to generate a scaled reference signal. At step 320, summer 238 may subtract the scaled reference signal from the received digital signal to generate an estimated interference. At step 322, extraction parameters and statistics may be computed and saved to refine acquisition and processing parameters for subsequent iterations to allow improved extraction. After completion of step 322, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using element 200 or any other system operable to implement method 300. In certain embodiments, method 300 may be implemented partially or fully in software and/or firmware, embodied in a memory or other computer-readable media and executable by a processor or other suitable device (e.g. digital circuitry 202).

Modifications, additions, or omissions may be made to system 100 and/or element 200 from the scope of the disclosure. The components of system 100 and/or element 200 may be integrated or separated. In addition, the components of system 100 and/or element 200 may be implemented in hardware, firmware, and/or software. Moreover, the operations of system 100 and/or element 200 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A communication element, comprising:
    a transmit path configured to convert a digital baseband signal into an analog signal and to transmit the analog signal;
    a receive path configured to receive the analog signal and to convert the analog signal into a received digital signal; and
    an interference extractor communicatively coupled to the transmit path and the receive path, the interference extractor configured to:
        modulate the digital baseband signal to generate a reference signal;
        estimate a delay between the received digital received signal and the reference signal;
        generate an aligned reference signal based on the reference signal and the delay;
        estimate a transmission gain of the received digital signal based on the received digital signal and the aligned reference signal;
        multiply the aligned reference signal by the transmission gain to generate a scaled reference signal; and
        subtract the scaled reference signal from the received digital signal to generate an estimate of the interference signal present in the received digital signal.

2. The communication element of claim 1, the interference extractor further configured to store the digital baseband signal, and wherein modulating the digital baseband signal to generate a reference signal comprises modulating the stored digital baseband signal.

3. The communication element of claim 1, the interference extractor further configured to, in order to estimate the delay:
    perform a fast correlation between the digital received signal and the reference signal to determine if a maximum correlation peak between the digital received signal and the reference signal is statistically significant; and
    determine the delay necessary to align the digital received signal and the reference signal.

4. The communication element of claim 1, the interference extractor further configured to, in order to generate the delayed reference signal, discard one or more digital samples of at least one of the received digital signal and the reference signal.

5. The communication element of claim 1, the interference extractor further configured to, in order to estimate the transmission gain, perform an adaptive algorithm to estimate a multiplicative factor necessary to scale the aligned reference signal to the received digital signal.

6. The communication element of claim 1, the interference extractor further configured to subtract the estimate of the interference signal from the received digital signal.

7. A method for the extraction of communication interference, comprising:
    transmitting the analog signal;
    receiving a received analog signal;
    converting the received analog signal into a received digital signal;
    storing the digital baseband signal to generate a reference signal;
    estimating a delay between the received digital signal and the reference signal;
    generating an aligned reference signal based on the reference signal and the delay;
    estimating a transmission gain of the received digital signal based on the received digital signal and the delayed reference signal;
    multiplying the aligned reference signal by the transmission gain to generate a scaled reference signal; and
    subtracting the scaled reference signal from the received digital signal to generate an estimated interference present in the received digital signal.

8. The method of claim 7 further comprising:
    converting a digital baseband signal into an analog signal; and
    storing the digital baseband signal for later use as a copy;
    wherein modulating the digital baseband signal to generate a reference signal comprises modulating the stored digital baseband signal.

9. The method of claim 7, wherein estimating the delay comprises:
    performing a fast correlation between the digital received signal and the reference signal to determine if a maximum correlation peak between the digital received signal and the reference signal is statistically significant; and
    determining the delay necessary to align the digital received signal and the reference signal.

10. The method of claim 7, wherein generating the aligned reference signal comprises discarding one or more digital samples of at least one of the received digital signal and the reference signal.

11. The method of claim 7, wherein estimating the transmission gain comprises performing an adaptive algorithm to estimate a multiplicative factor necessary to scale the aligned reference signal to the received digital signal.

12. The method of claim 7, further comprising subtracting the estimate of the interference signal from the received digital signal.

13. A system for the extraction of communication interference, comprising:
- logic for converting a digital baseband signal into an analog signal;
- logic for transmitting the analog signal;
- logic for receiving a received analog signal;
- logic for converting the received analog signal after receipt into a received digital signal;
- logic for generating a reference signal;
- logic for estimating a delay between the received digital signal and the reference signal;
- logic for generating a aligned reference signal based on the reference signal and the delay;
- logic for estimating a transmission gain of the received digital signal based on the received digital signal and the aligned reference signal;
- logic for multiplying the aligned reference signal by the transmission gain to generate a scaled reference signal; and
- logic for subtracting the scaled reference signal from the received digital signal to generate an estimated interference present in the received digital signal.

14. The system of claim 13, further comprising logic for storing the digital baseband signal for later use as a copy, and wherein the logic for modulating the digital baseband signal to generate a reference signal comprises logic for modulating the stored digital baseband signal.

15. The system of claim 13, wherein the logic for estimating the delay comprises:
- logic for performing a fast correlation between the digital received signal and the reference signal to determine if a maximum correlation peak between the digital received signal and the reference signal is statistically significant; and
- logic for determining the delay necessary to align the digital received signal and the reference signal.

16. The system of claim 13, wherein the logic for generating the delayed reference signal comprises logic for discarding one or more digital samples of at least one of the received digital signal and the reference signal.

17. The system of claim 13, wherein the logic for estimating the transmission gain comprises logic for performing an adaptive algorithm to estimate a multiplicative factor necessary to scale the aligned reference signal to the received digital signal.

18. The system of claim 13, further comprising logic for subtracting the estimate of the interference signal from the received digital signal.

* * * * *